United States Patent [19]

Dellanno

[11] Patent Number: 5,580,124
[45] Date of Patent: Dec. 3, 1996

[54] APPARATUS FOR PREVENTING WHIPLASH

[76] Inventor: Ronald P. Dellanno, 40 Fox Run, North Caldwell, N.J. 07006

[21] Appl. No.: 495,067

[22] Filed: Jun. 26, 1995

[51] Int. Cl.$^6$ ........................................ B60N 2/42
[52] U.S. Cl. ............... 297/216.12; 297/396; 297/452.29; 297/DIG. 3
[58] Field of Search ..................... 297/391, 396, 297/216.12, 216.1, 216.13, 216.14, DIG. 3, 452.41, 284.1, 284.4, 284.6, 452.29, 452.3, 452.31, 452.32, 217.3, 452.48, 452.55, 452.57, 452.65

[56] References Cited

U.S. PATENT DOCUMENTS

| | | | |
|---|---|---|---|
| 3,508,788 | 4/1970 | Barton, Jr. et al. | 297/391 |
| 3,838,870 | 10/1974 | Hug | 297/216.12 X |
| 4,285,081 | 8/1981 | Price | 297/391 X |
| 5,181,763 | 1/1993 | Dellanno et al. | 297/391 |
| 5,290,089 | 3/1994 | Oleszko et al. | 297/216.14 |
| 5,290,091 | 3/1994 | Dellanno et al. | 297/391 |

*Primary Examiner*—Milton Nelson, Jr.
*Attorney, Agent, or Firm*—Klauber & Jackson

[57] ABSTRACT

A vehicle-installed supporting seat for a passenger is provided, which includes a seat back provided with an integral head-neck restraint comprising a cranium support portion and a cervical spine support portion. Each portion includes a layer of resilient material supported on an underlying inflexible support shell, which together act to effectively define a contour that interfits with the posterior contour of the passenger's cranium and cervical spine. This contour thus presents a first surface located behind the passenger's cranium for contacting the approximate center of mass of the cranium and supporting the approximate central posterior area of the passenger's cranium, and a second surface located below the first surface and defining a substantially convex smooth curve, the maximum protrusion point of which projects anteriorly relative to where the first surface contacts the center of mass of the passenger's cranium, the second surface thereby contacting and supporting the posterior portion of the passenger's cervical spine substantially simultaneously with the contact of the passenger's cranium with the first surface. The support shell is rearwardly displaceable upon being subjected to impressed forces generated from the passenger pressing against the restraint as a result of a rear end impact at the vehicle. A controllably deformable energy absorbing crush zone is disposed to the rear of the shell as to be compressed by the rearward displacement of the shell. The interfitting contour and thereby the inflexible shell, upon being displaced by the impressed forces toward the underlying crush zone, retain the shape of the contour, whereby the cervical and cranium support portions act to substantially simultaneously decelerate the cranium and cervical spine of the passenger during a vehicle rear end impact while the controlled deformation of the crush zone absorbs energy, to prevent whiplash-related injuries to the passenger.

13 Claims, 2 Drawing Sheets

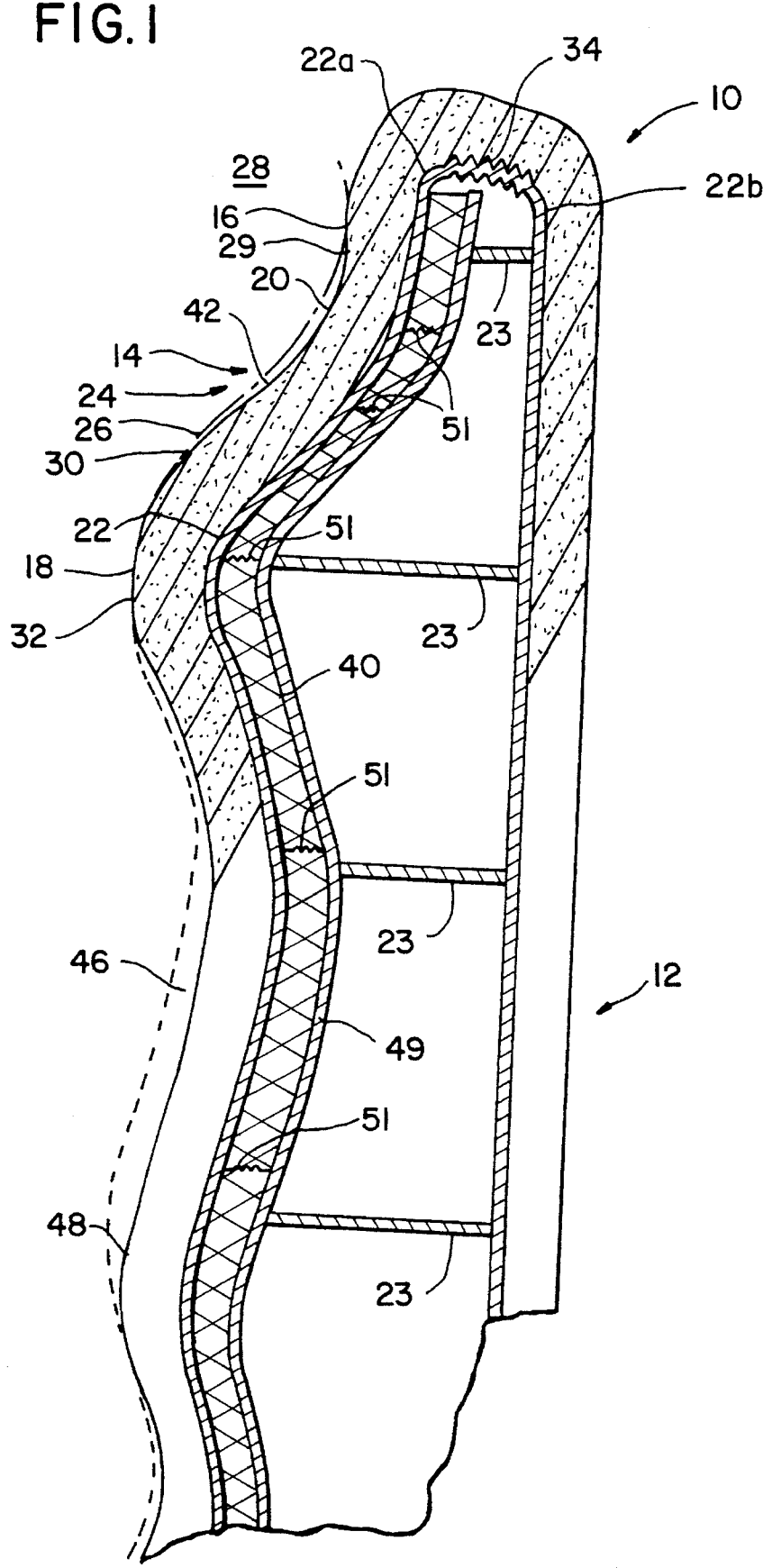

APPARATUS FOR PREVENTING WHIPLASH

FIELD OF THE INVENTION

This invention relates generally to apparatus for supporting a person's cranium, cervical, thoracic, and lumbar spine, including passenger safety apparatus for vehicles, and more specifically, relates to apparatus for preventing whiplash related and similar injuries.

BACKGROUND OF INVENTION

Whiplash related injuries are caused by the rapid acceleration of a person's cranium and cervical spine, which occurs, for example, in a rear end automobile collision. The rapid acceleration causes the extension and flexion of the cervical spine which, in turn, can cause severe injury. Types of whiplash related injuries include fractured and/or dislocated vertebrae, torn ligaments (both anterior and posterior of the spinal column), and avulsion of parts of the vertebrae, ligaments and intervertebrae discs. Similar injuries can occur to the thoracic and lumbar spinal areas.

It has thus been found, for example, that the C4, C5 and C6 cervical vertebrae, and the paravertebrae ligaments are most often damaged with whiplash related injuries, although the entire cervical as well as the thoracic and lumbar spine may well be involved. Rapid hyperextension of the cervical spine can thus stretch the anterior longitudinal ligament, thus placing it in traction and causing either bone or ligamentous damage. Such hyperextension typically damages the C1 through C7 cervical vertebrae. The vertebral artery, which extends through an opening in the vertebrae, and the sympathetic nerve fibers that surround the artery are also often damaged. These types of injuries cause severe disabilities and, in some instances, death.

Seatbacks and/or headrests in automobiles, trucks, and other types of vehicles are provided to prevent whiplash related injuries to passengers during collisions, but typically fail. During a rear-end vehicle collision, the forces of the collision typically cause a passenger's cranium and cervical spine to rapidly accelerate toward the rear of the vehicle. Once the cranium strikes the seatback or headrest, it then rapidly accelerates in the opposite direction toward the front of the vehicle. The rearward acceleration of the cranium, and resulting collision with the seatback or headrest, causes hyperextension of the cervical spine and, thus typically injures the anterior structure of the passenger's neck. The forward acceleration of the cranium, on the other hand, causes hyperflexion of the cervical spine and typically injures the posterior structure of the neck.

One problem with known seatbacks and/or headrests is that the surface intended to stop the movement of a person's head and neck is typically flat, or does not correspond to the posterior contour thereof. As a result, during a rear-end collision, typically the back, or posterior portion of the cranium is the first portion of the passenger's body to strike the seatback or headrest. However, the cervical spine, which is located inferiorly with respect to the posterior portion of the cranium, continues to move toward the headrest. As a result the cervical spine is forced to move relative to the cranium which, in turn, causes severe vertebral damage.

Also, the top surfaces of many known headrests are located at about the same height, or below the height of a passenger's ears, which is normally about the center of gravity of the head. When a passenger's cranium is forced against such a headrest during a collision, it often slides upwardly over the top edge of the headrest. As a result, the cranium is stretched upwardly relative to the cervical spine, typically causing further vertebral damage.

In my issued U.S. Pat. Nos. 5,181,763 and 5,290,091, the entire disclosures of which are hereby incorporated by reference, apparatus is disclosed for preventing whiplash-related injuries to a passenger in a vehicle. In one embodiment of these inventions, the apparatus comprises a frame supported on a seat of the vehicle and located behind the cranium and cervical spine of a passenger on the seat. A layer of resilient material is supported on the frame, the layer of resilient material defining a supporting means located behind the cranium and cervical spine of the passenger and defining one or more contours that interfit with the posterior contour of the passenger's cranium and cervical spine. The supporting means includes a first surface located behind the passenger's cranium and projecting upwardly above the approximate center of mass of the passenger's cranium and having a substantially flat portion including a cranium contact zone for contacting and supporting the approximate central posterior area of the passenger's cranium; and a second surface located below the first surface and defining a substantially convex smooth curve, the maximum protrusion point of which projects anteriorly relative to the flat portion of the first surface. The second surface thereby contacts and supports the posterior portion of the passenger's cervical spine substantially simultaneously with the contact of the passenger's cranium with the first surface, thereby substantially simultaneously decelerating the cranium and cervical spine during a vehicle collision to prevent whiplash-related injuries to the passenger.

In such prior invention, the second surface is smoothly joined to the first surfaces by a transition surface which extends anteriorly at an obtuse angle from the first surface and is located to support the passenger's posterior area approximately where the cranium meets the cervical spine.

A support member is coupled to the frame and supported on the seat, the support member being vertically moveable relative to the seat to adjust the position of the apparatus relative to the passenger and, thus, adjust the position of the supporting means to correspond to the posterior contour of the passenger's cranium and cervical spine.

The frame can define a hollow enclosure and the layer of resilient material may consist essentially of a urethane foam which is molded thereon.

The frame is journaled to the support member and normally biased toward the front of the seat, whereupon during a vehicle collision, when the passenger's head is forced toward the apparatus, the posterior portion of the passenger's cranium initially contacts the first surface of the supporting means and rotates the frame relative to the support member toward the back of the seat and, in turn, rotates the second supporting surface into contact with the posterior portion of the passenger's lower cranium and cervical spine.

In a further embodiment of our prior apparatus, the first and second surfaces are defined at mutually spaced first and second support bodies, and the apparatus further includes means for vertically and horizontally displacing the first and second surfaces to adjust the position of same to accurately interfit with the posterior contour of different passengers.

The first and second support bodies can be coupled to the frame and rendered movable by rack and pinion or equivalent means to enable desired vertical and/or horizontal displacements of same.

It may be noted in the foregoing discussions, that the construction of most prior art seatbacks and head rests incorporate materials that in an effort to provide maximum comfort, are highly resilient. Such materials while they may absorb some of the impact energy which is generated as the passenger is thrown rearwardly against the seat during a rear end impact, promptly transfer the absorbed energy back to the passenger, causing a rebound effect, which only adds to the detrimental conditions which foster injury.

In accordance with the foregoing, it may be regarded as an object of the present invention, to overcome the problems and disadvantages of known apparatus for preventing whiplash, such as vehicle headrests and seatbacks.

It is a further object of the present invention, to provide apparatus of the foregoing type, which includes means for efficiently and safely absorbing impact energy, thereby further diminishing the likelihood of passenger injury.

SUMMARY OF THE INVENTION

Now in accordance with the present invention, important modifications and improvements have been made in the aforementioned prior art apparatus to thereby provide improved apparatus for preventing whiplash-related injuries to a passenger in a vehicle. In accordance with the invention, a vehicle-installed supporting seat for the passenger is provided, which includes a seat back provided with an integral head-neck restraint comprising a cranium support portion and a cervical spine support portion. Each said portion includes a layer of resilient material supported on an underlying inflexible support shell, which together act to effectively define a contour that interfits with the posterior contour of the passenger's cranium and cervical spine. This contour thus presents a first surface located behind the passenger's cranium for contacting the approximate center of mass of the cranium and supporting the approximate central posterior area of the passenger's cranium, and a second surface located below the first surface and defining a substantially convex smooth curve, the maximum protrusion point of which projects anteriorly relative to where the first surface contacts the center of mass of the passenger's cranium, the said second surface thereby contacting and supporting the posterior portion of the passenger's cervical spine substantially simultaneously with the said contact of the passenger's cranium with said first surface. The support shell is rearwardly displaceable upon being subjected to impressed forces generated from the passenger pressing against the restraint as a result of a rear end impact at said vehicle. A controllably deformable energy absorbing crush zone is disposed to the rear of the shell as to be compressed by the rearward displacement of the shell. The interfitting contour and thereby the inflexible shell, upon being displaced by said forces toward the underlying crush zone, retain the shape of the contour, whereby the cervical and cranium support portions act to substantially simultaneously decelerate the cranium and cervical spine of the passenger during a vehicle rear end impact, while the controlled deformation of the crush zone absorbs energy, to prevent whiplash-related injuries to the passenger.

The second surface of said contour is smoothly joined to said first surface by a transition surface of said contour, which extends anteriorly at an obtuse angle from said first surface, and which is located to support the passenger's posterior area approximately where the cranium meets the cervical spine. The maximum protrusion point of said second surface projects anteriorly relative to said flat portion of said first surface a distance of 1 to 6 inches, and the maximum protrusion point is from 3 to 9 inches below the cranium contact zone.

The apparatus of the invention preferably further includes a thoracic and lumbar spine support portion which are defined by downward extension of the support shell, resilient material and contour; whereby the thoracic and lumbar spine portion of the passenger are decelerated with the cranium and cervical spine during a rear end impact.

The crush zone may comprise one or more air bladders, and valve means responsive to rear end vehicular impact to enable the one or more bladders to at least partially deflate. The inflexible shell can, for example, be linked to one or more mechanical actuators which open the valves upon a predetermined displacement of the shell; or one or more sensors can upon detecting a rear end impact, actuate the valves to enable controlled deflation of the air bladders.

Similarly, one or more rear impact sensors can enable control signals upon an impact of sufficient magnitude, which signal disables a restraint means, e.g. by releasing a mechanical stop which otherwise prevents displacement of the inflexible shell (or of a plate linked to the shell) against or into the crush zone.

In another aspect of the invention, the crush zone can comprise an impact collapsible cellular structure, such as a frangible foam. In still a further aspect, the crush zone may comprise an elastically deformable material which absorbs energy at a substantially more rapid rate than it releases same.

The crush zone may be sandwiched between the inflexible shell and a spaced fixed, rigid plate; or the crush zone can be spaced from the rear of the shell and contacted and compressed by an intermediate plate which is linked for displacement with the shell. Rearward displacement of the shell may be resisted by restraining means adapted to collapse at a preset strain.

BRIEF DESCRIPTION OF THE DRAWINGS

The invention is diagrammatically illustrated, by way of example, in the drawings appended hereto in which:

FIG. 1 a simplified, schematic cross-section illustrating apparatus in accordance with the present invention;

DESCRIPTION OF PREFERRED EMBODIMENTS

Figure 3:
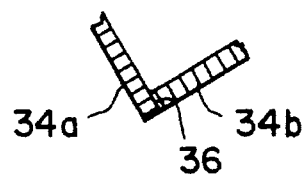
FIG. 3 depicts an enlarged cross-section of a portion of the FIG. 1 apparatus, and illustrates an arrangement enabling rearward displacement of the inflexible shell to occur at a pre-set force level.

In FIG. 1, a cross-sectional view, schematic in nature, appears through apparatus 10 in accordance with the present invention. The vehicle-installed supporting seat for the passenger includes a conventional seating area, which is not shown in the drawing. Extending in a vertically upward direction from the seating area is a seat back 12 provided with an integral head-neck restraint 14 comprising a cranium support portion 16 and a cervical spine support portion 18. Each said portion includes a layer of resilient material 20 supported on an underlying inflexible support shell 22. The material 20 and the shell 22 together act to effectively define a contour 24 that interfits with the posterior contour 26 of the passenger 28's cranium and cervical spine. This contour 26 thus presents a first surface 29 located behind the passenger's cranium for contacting the approximate center of mass of the cranium and supporting the approximate central posterior area of the passenger's cranium, and a second surface 30 located below the first surface and defining a substantially convex smooth curve, the maximum protrusion point 32 of which projects anteriorly relative to where the first surface 29 contacts the center of mass of the passenger's cranium, the said second surface 30 thereby contacting and supporting the posterior portion of the passenger's cervical spine substantially simultaneously with the said contact of the passenger's cranium with said first surface.

The support shell 22 may comprise a hard relatively inflexible plastic, or similarly may comprise metal or the like. Shell 22 is rearwardly displaceable upon being subjected to impressed forces generated from the passenger 28 pressing against the restraint as a result of a rear end impact at the vehicle. In the embodiment shown in FIG. 1 this is enabled by having the shell 22 formed as a front piece 22a and a rear piece 22b, the two pieces being interconnected by one or more flexible accordion pleats, the uppermost of which appears at 34. In another embodiment of the invention the pleats 34 can instead of being entirely flexible, be formed of rigid interconnected units as shown in the enlarged partial view of FIG. 3. In this arrangement, the elements 34a and 34b are disposed to shear from one another at point 36 upon a preset force level being attained, whereby rearward displacement of shell 22 only can occur when impact forces are sufficient to cause the said shearing.

A controllably deformable energy absorbing crush zone 40 is disposed to the rear of the shell 22 as to be compressed by the rearward displacement of the shell. The interfitting contour 24 and thereby the inflexible shell 22, upon being displaced by said forces toward the underlying crush zone 40, retain the shape of the contour 24, whereby the cervical and cranium support portions act to substantially simultaneously decelerate the cranium and cervical spine of the passenger during a vehicle rear end impact, while the controlled deformation of the crush zone absorbs energy, to prevent whiplash-related injuries to the passenger.

The second surface 30 of contour 24 is smoothly joined to the first surface 29 by a transition surface 42 of said contour, which extends anteriorly at an obtuse angle from said first surface, and which is located to support the passenger's posterior area approximately where the cranium meets the cervical spine. The maximum protrusion point 32 of said second surface 30 projects anteriorly relative to said flat portion of said first surface 29 a distance of 1 to 6 inches, and the maximum protrusion point 32 is from 3 to 9 inches below the cranium contact zone.

The apparatus 10 of the invention preferably further includes thoracic and lumbar spine support portions 46 and 48, which are defined by downward extension of the support shell 22, resilient material 20 and contour 24; whereby the thoracic and lumbar spine portions of the passenger 28 are decelerated with the cranium and cervical spine during a rear end impact.

Figure 2:
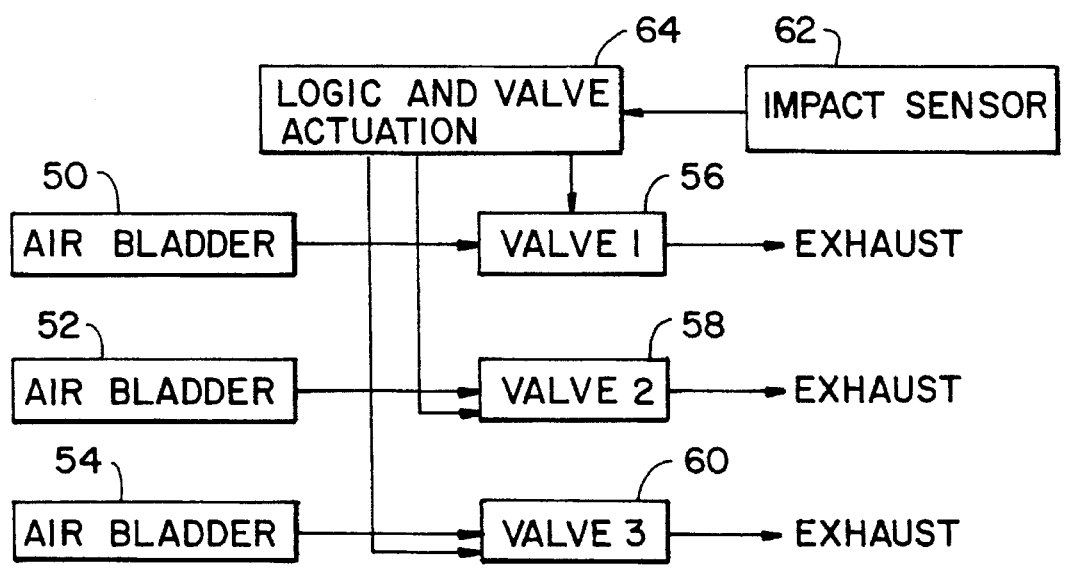
FIG. 2 is a schematic block diagram illustrating use of an impact sensor to enable controlled collapse of a series of air bladders where the latter comprise the crush zone.

The crush zone 40 may comprise one or more air bladders, and valve means responsive to rear end vehicular impact to enable the one or more bladders to at least partially deflate. One such arrangement enabling this is shown schematically in FIG. 2. Illustratively three air bladders 50, 52 and 54 are shown, which may be disposed in side by side relation as crush zone 40. Each of the air bladders may be vented to atmosphere by respective normally closed valves 56, 58, and 60, which can be solonoid actuated. An impact sensor 62 is mounted to the vehicle and the signal output from same is provided to logic and valve actuator means 64. In the event that the output signal from sensor 62 exceeds a predetermined threshold level, control signals are provided to valves 56, 58, and 60, causing same to open and permit rapid but controlled deflation of the air bladders. Thus the crush zone is responsive to a rear end impact exceeding a predetermined level, and under such conditions acts to absorb energy as the shell 22 is displaced toward the crush zone. In another embodiment of the invention, the inflexible shell can be linked to one or more mechanical actuators which open the valves upon a predetermined displacement of the shell.

In another aspect of the invention, the crush zone can comprise an impact collapsible cellular structure, such as a frangible foam. The cellular structure can similarly comprise the well known bubble packing, which is commonly used to protect fragile objects during shipping. Other controllably collapsible or deformable materials can be used for crush zone 40, for example frangible ceramic or organic foams, or the like. The important consideration is that any such materials shall collapse or deform under suitable imposed forces in a controllable fashion so that they not only enable controlled rearward displacement of piece 22a, but also absorb energy in doing so. Thus by way of example, it will be clear that the bubble type packing material referred to absorbs energy during collapse as each of the cells is ruptured due to pressure forces.

In still a further aspect, the crush zone may comprise an elastically deformable material which absorbs energy at a substantially more rapid rate than it releases same.

Figure 4:
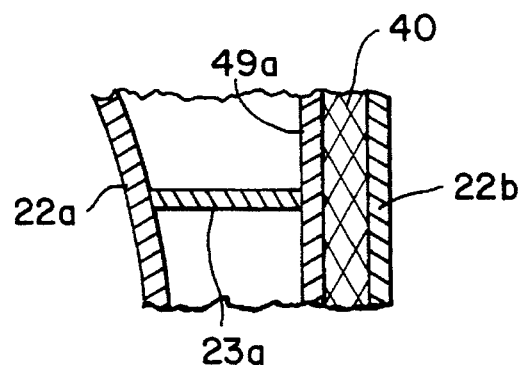
FIG. 4 is a partial cross sectional view, similar to FIG. 1, but showing an arrangement wherein the crush zone is formed toward the rear of the seat back.

The crush zone 40 may as shown in FIG. 1 be sandwiched between the inflexible shell 22 (via piece 22a) and a spaced fixed, rigid plate 49, which is maintained in its position by support members 23 which extend between plate 49 and back piece 22b. Compression springs 51 may be provided between shell 22 and plate 49 to aid in restoring the original spacing following the controlled collapse of the crush zone. In the variation shown in the partial cross section of FIG. 4, the crush zone 40 is placed to the rear of seat back 12. Here the rearward displacement of piece 22a moves plate 49a which is rigidly linked to piece 22a by members 23a.

While the present invention has been particularly described in terms of specific embodiments thereof, it will be understood that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. Apparatus for preventing whiplash-related injuries to a passenger in a vehicle, comprising:

a vehicle-installed supporting seat for said passenger, which includes a seat back provided with an integral head-neck restraint comprising a cranium support portion and a cervical spine support portion; each said portion including a layer of resilient material supported on an underlying inflexible support shell, and together acting to effectively define a support contour that interfits with the posterior contour of the passenger's cranium and cervical spine when seated; said support contour presenting a first surface located behind the seated passenger's cranium for contacting the approximate center of mass of the cranium and supporting the approximate central posterior area of the seated passenger's cranium, and a second surface located below the first surface and defining a substantially convex smooth curve, a maximum protrusion point of which in the direction of passenger support projects anteriorly relative to where the first surface contacts the center of mass of the related passenger's cranium, said second surface thereby contacting and supporting the posterior portion of the Seated passenger's cervical spine substantially simultaneously with the contact of the seated passenger's cranium with said first surface;

said support shell being rearwardly displaceable upon being subjected to impressed forces generated from the seated passenger pressing against the restraint as a result of a rear end impact at said vehicle; and a controllably deformable energy absorbing crush zone being disposed to the rear of said shell as to be compressed by said rearward displacement of the shell; said interfitting support contour and thereby said inflexible shell upon being displaced by said forces toward the crush zone, retaining the shape of the support contour, whereby said cervical and cranium support portions act to substantially simultaneously decelerate the cranium and cervical spine of the passenger during a vehicle rear end impact, while the controlled deformation of said crush zone absorbs energy, to prevent whiplash-related injuries to the passenger.

2. Apparatus in accordance with claim 1, wherein said second surface of said support contour is smoothly joined to said first surface by a transition surface of said support contour, which extends anteriorly at an obtuse angle from said first surface, and which is located to support the passenger's posterior area approximately where the cranium meets the cervical spine.

3. Apparatus in accordance with claim 1, wherein the maximum protrusion point of said second surface projects anteriorly relative to the first surface contact point for the cranium of the seated passenger a distance of 1 to 6 inches.

4. Apparatus in accordance with claim 3, wherein said maximum protrusion point is from 3 to 9 inches below a contact zone at the first surface for the cranium of the seated passenger.

5. Apparatus in accordance with claim 1, further including a thoracic and lumbar spine support portion which are defined by downward extension of said support shell, resilient material and support contour; whereby the thoracic and lumbar spine portion of the passenger are decelerated with the cranium and cervical spine during a said rear end impact.

6. Apparatus in accordance with claims 1 or 5, wherein said crush zone comprises an impact collapsible cellular structure.

7. Apparatus in accordance with claims 1 or 5, wherein said crush zone comprises an elastically deformable material which absorbs energy at a substantially more rapid rate than it releases same.

8. Apparatus in accordance with claims 1 or 5, wherein said crush zone is sandwiched between said shell and a spaced fixed, rigid plate.

9. Apparatus in accordance with claims 1 or 5, wherein said crush zone is spaced from the rear of said shell and contacted and compressed by an intermediate plate which is linked for displacement with said shell.

10. Apparatus in accordance with claims 1 or 5, wherein rearward displacement of said shell is resisted by restraining means adapted to collapse at a preset strain.

11. Apparatus in accordance with claims 1 or 5, further including sensor means for enabling a control signal upon a rear end impact of sufficient magnitude, and wherein rearward displacement of one of said shell and a plate rigidly linked to said shell against said crush zone, is resisted by restraining means which are disabled by said control signal.

12. Apparatus in accordance with claims 1 or 5, wherein the crush zone comprises at least one air bladder, and valve means responsive to said impact to enable said at least one bladder to at least partially deflate upon vehicular impact.

13. Apparatus in accordance with claim 12 wherein said shell is linked to at least one mechanical valve actuator, which open said valve means upon a predetermined displacement of said shell.

* * * * *